United States Patent
Okada et al.

(10) Patent No.: US 12,322,761 B2
(45) Date of Patent: Jun. 3, 2025

(54) AQUEOUS SODIUM ION SECONDARY BATTERY

(71) Applicants: KYUSHU UNIVERSITY, NATIONAL UNIVERSITY CORPORATION, Fukuoka (JP); TOSOH CORPORATION, Yamaguchi (JP)

(72) Inventors: Shigeto Okada, Fukuoka (JP); Baowei Xie, Fukuoka (JP); Toshiya Takahara, Tokyo (JP); Wataru Kobayashi, Tokyo (JP); Masaki Okada, Kanagawa (JP)

(73) Assignees: KYUSHU UNIVERSITY, NATIONAL UNIVERSITY CORPORATION, Fukuoka (JP); TOSOH CORPORATION, Yamaguchi (JP)

( * ) Notice: Subject to any disclaimer, the term of this patent is extended or adjusted under 35 U.S.C. 154(b) by 726 days.

(21) Appl. No.: 17/613,335

(22) PCT Filed: May 27, 2020

(86) PCT No.: PCT/JP2020/020990
§ 371 (c)(1),
(2) Date: Nov. 22, 2021

(87) PCT Pub. No.: WO2020/241713
PCT Pub. Date: Dec. 3, 2020

(65) Prior Publication Data
US 2022/0223924 A1 Jul. 14, 2022

(30) Foreign Application Priority Data
May 27, 2019 (JP) .................. 2019-098326

(51) Int. Cl.
H01M 10/36 (2010.01)
H01M 4/485 (2010.01)
H01M 4/525 (2010.01)

(52) U.S. Cl.
CPC .......... H01M 10/36 (2013.01); H01M 4/485 (2013.01); H01M 4/525 (2013.01); *H01M 2300/0005* (2013.01)

(58) Field of Classification Search
CPC ...... H01M 10/36; H01M 4/486; H01M 4/525; H01M 2300/0005
(Continued)

(56) References Cited

U.S. PATENT DOCUMENTS

2013/0089486 A1   4/2013  Ceder et al.
2016/0118683 A1*  4/2016  Nakanishi ........... H01M 4/5825
                                                        429/200

(Continued)

FOREIGN PATENT DOCUMENTS

CN    104466100 A    3/2015
JP    2013-520383 A  6/2013
(Continued)

OTHER PUBLICATIONS

Hailong Chen et al., "Sidorenkite ($Na_3MnPO_4CO_3$): A New Intercalation Cathode Material for Na-Ion Batteries", Chemistry of Materials, 25, Jul. 11, 2013, pp. 2777-2786.
(Continued)

*Primary Examiner* — James M Erwin
(74) *Attorney, Agent, or Firm* — GREENBLUM & BERNSTEIN, P.L.C.

(57) ABSTRACT

To provide an aqueous sodium ion secondary battery which can achieve a high electrochemical capacity as compared with a known sodium ion secondary battery having an aqueous electrolytic solution.
(Continued)

An aqueous sodium ion secondary battery includes a cathode, an anode, an electrolytic solution and a separator, wherein the cathode has at least a cathode active material containing at least a sodium transition metal polyanion represented by the formula $Na_{3-x}MPO_4CO_3$ (M is at least one member selected from the group consisting of Fe, Mn, Ni and Co, and x is 0 or more and 2 or less), and the electrolytic solution is an aqueous electrolytic solution.

10 Claims, 3 Drawing Sheets

(58) Field of Classification Search
USPC .......................................................... 429/199
See application file for complete search history.

(56) References Cited

U.S. PATENT DOCUMENTS

| | | | |
|---|---|---|---|
| 2017/0062868 A1* | 3/2017 | Kageura | H01M 4/525 |
| 2018/0053968 A1* | 2/2018 | Sava Gallis | H01M 50/107 |
| 2018/0358654 A1* | 12/2018 | Forsyth | H01M 4/583 |
| 2019/0173079 A1* | 6/2019 | Zhamu | H01M 4/483 |

FOREIGN PATENT DOCUMENTS

| | | |
|---|---|---|
| JP | 2014-107115 A | 6/2014 |
| JP | 2014-107160 A | 6/2014 |
| WO | 2014/073702 A1 | 5/2014 |
| WO | 2016/129668 A1 | 8/2016 |
| WO | 2016/129677 A1 | 8/2016 |

OTHER PUBLICATIONS

Chuanlong Wang et al., "Roles of Processing, Structural Defects and Ionic Conductivity in the Electrochemical Performance of $Na_3MnCO_3PO_4$ Cathode Material", Journal of The Electrochemical Society, May 28, 2015, vol. 162, No. 8, pp. A1601-A1609, https://doi.org/10.1149/2.0801508jes, Materials and Methods, Result and Discussion.

Kosuke Nakamoto et al., "Effect of Concentrated Electrolyte for Aqueous Sodium-ion Battery, 57th Battery Forum", The Electrochemical Society of Japan, Nov. 29, 2015.

International Search Report issued in International Patent Application No. PCT/JP2020/020990, dated Sep. 1, 2020, along with an English translation thereof.

International Preliminary Report on Patentability issued in International Patent Application No. PCT/JP2020/020990, dated Nov. 16, 2021.

Fang Yongjin et al: "Phosphate Framework Electrode Materials for Sodium Ion Batteries", Advanced Science, vol. 4, No. 5, May 1, 2017 (May 1, 2017), p. 1600392, X193047617, ISSN: 2198-3844, DOI: 10.1002/advs.201600392 Retrieved from the Internet: URL:https://api.wiley.com/onlinelibrary/tdm/v1/articles/10.1002%2Fadvs.201600392>.

Database WPI, Week 201444, Thomson Scientific, London, AN 2014-M00127, XP002809308, May 15, 2014 (May 15, 2014) (also refers to WO 2014/073702 A1 (Univ Kyushu Nat Corp), previously cited.

Database WPI Week 201541, Thomson Scientific, London GB; AN 2015-30097L, X1002809309, (Univ Jilin) Mar. 25, 2015 (Mar. 25, 2015); (also refers to CN 104 466 100 A (Univ Jilin), previously cited).

Database WPI Week 201659, Thomson Scientific, London GB; AN 2016-50333K, X1002809310, (Nissan Chem Ind Ltd) Aug. 18, 2016 (Aug. 18, 2016).

Partial machine translation (see, e.g., pp. 1 and 4) of the Notice of Reasons for Refusal that issued in corresponding Japanese Patent Appl. No. 2021-522833, shipped/dated Feb. 4, 2025.

* cited by examiner

AQUEOUS SODIUM ION SECONDARY BATTERY

TECHNICAL FIELD

The present invention belongs to a technical field of a secondary battery. Particularly, it relates to an aqueous sodium ion secondary battery.

BACKGROUND ART

Sodium ion secondary batteries, which do not use lithium, one of rare metals, attract attention as a post-lithium ion secondary battery. As a sodium ion secondary battery, one comprising an electrolytic solution similar to that of a conventional lithium ion secondary battery, mainly non-aqueous electrolytic solution, has been mainly studied. On the other hand, a sodium ion secondary battery employing as the electrolytic solution an aqueous electrolytic solution using water which is available at low cost, has been studied.

In Patent Document 1 and Non-Patent Document 1, it is confirmed that in a sodium ion secondary battery having an aqueous electrolytic solution, charge and discharge by reversible intercalation/deintercalation of Na cation occurs. The electrochemical capacity of such a sodium ion secondary battery at the initial charge and discharge was at a level of 120 mAh/g.

PRIOR ART DOCUMENTS

Patent Document

Patent Document 1: JP-A-2013-520383

Non-Patent Document

Non-Patent Document 1: H. Chen et al., Chemistry of Materials, 25, 2777-2786 (2013)

DISCLOSURE OF INVENTION

Technical Problem

The object of the present invention is to provide an aqueous sodium ion secondary battery which can achieve a high electrochemical capacity as compared with a known sodium ion secondary battery having an aqueous electrolytic solution.

Solution to Problem

The present inventors have conducted extensive studies on a sodium ion secondary battery having an aqueous electrolytic solution (hereinafter referred to as "aqueous sodium ion secondary battery") and found the following. That is, by using a sodium-containing transition metal polyanion containing three Na cations, as the cathode active material, it is possible to constitute an aqueous sodium ion secondary battery which can achieve a higher electrochemical capacity as compared with a conventional aqueous sodium ion secondary battery.

That is, the summary of the present invention is as follows.

[1] An aqueous sodium ion secondary battery comprising a cathode, an anode, an electrolytic solution and a separator, wherein the cathode comprises a cathode active material containing at least a sodium transition metal polyanion represented by the formula $Na_{3-x}MPO_4CO_3$ (M is at least one member selected from the group consisting of Fe, Mn, Ni and Co, and x is 0 or more and 2 or less), and the electrolytic solution is an aqueous electrolytic solution.

[2] The aqueous sodium ion secondary battery according to the above [1], wherein the sodium transition metal polyanion has carbon on a part of or the entire surface.

[3] The aqueous sodium ion secondary battery according to the above [1] or [2], wherein the sodium transition metal polyanion has a crystallite size of 90 Å or longer and 400 Å or shorter.

[4] The aqueous sodium ion secondary battery according to any one of the above [1] to [3], wherein the aqueous electrolytic solution contains at least one member selected from the group consisting of $Na_2SO_4$, $NaNO_3$ and $NaClO_4$.

[5] The aqueous sodium ion secondary battery according to any one of the above [1] to [4], wherein the aqueous electrolytic solution contains $NaClO_4$.

[6] The aqueous sodium secondary battery according to the above [5], wherein the electrolyte concentration in the electrolytic solution is 5 mol/kg or higher.

[7] The aqueous sodium ion secondary battery according to any one of the above [1] to [6], wherein the anode comprises at least $NaTi_2(PO_4)_3$.

[8] The aqueous sodium ion secondary battery according to any one of the above [1] to [7], wherein the cathode has a cathode active material containing at least a sodium transition metal polyanion represented by the formula $Na_{3-x}FePO_4CO_3$ (x is 0 or more and 2 or less), the anode contains at least $NaTi_2(PO_4)_3$, and the aqueous electrolytic solution contains at least $NaClO_4$.

[9] A cathode active material for an aqueous sodium ion secondary battery, which contains at least a sodium transition metal polyanion represented by the formula $Na_{3-x}MPO_4CO_3$ (M is at least one member selected from the group consisting of Fe, Mn, Ni and Co, and x is 0 or more and 2 or less).

[10] The cathode active material for an aqueous sodium ion battery according to the above [9], wherein M contains at least Fe.

Advantageous Effects of Invention

According to the present invention, it is possible to provide an aqueous sodium ion secondary battery which can achieve a high electrochemical capacity as compared with a known sodium ion secondary battery having an aqueous electrolytic solution.

DESCRIPTION OF EMBODIMENTS

DESCRIPTION OF EMBODIMENTS

Figure 1:
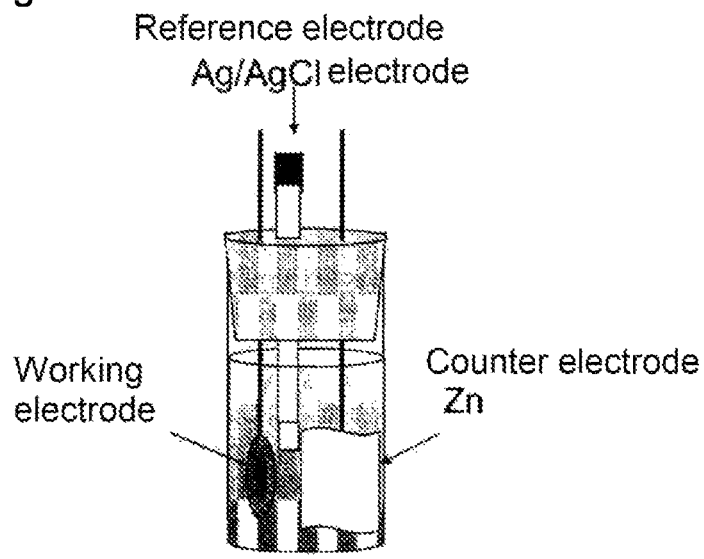
FIG. 1 is a schematic view illustrating a sodium ion secondary battery (half cell).

Now, preferred embodiments of the aqueous sodium ion secondary battery of the present invention will be described. In the following, the terms sodium ion secondary battery, sodium secondary battery and sodium ion battery are used to have the same meanings.

The cathode of the aqueous sodium ion secondary battery of the present embodiment has a cathode active material containing at least a sodium transition metal polyanion represented by the formula $Na_{3-x}MPO_4CO_3$ (M is at least one member selected from the group consisting of Fe, Mn, Ni and Co, and x is 0 or more and 2 or less) (hereinafter referred to as "Na polyanion"). The Na polyanion is a sodium-containing transition metal carbophosphate, and is preferably a synthetic sodium-containing transition metal carbophosphate which is artificially synthesized. This functions as a cathode active material of an aqueous sodium ion secondary battery. Further, the Na polyanion of the present embodiment is a cathode active material for an aqueous sodium ion secondary battery, containing at least a sodium transition metal polyanion represented by the formula $Na_{3-x}MPO_4CO_3$ (M is at least one member selected from the group consisting of Fe, Mn, Ni and Co, and x is 0 or more and 2 or less).

M preferably contains at least Fe, more preferably is at least either one of Fe and Mn, particularly preferably is Fe. Further, x may be 0 or more and 1 or less.

As a specific Na polyanion, at least one member selected from the group consisting of a sodium iron carbophosphate, a sodium manganese carbophosphate, a sodium nickel carbophosphate and a sodium cobalt carbophosphate, more preferably at least one member selected from the group consisting of a sodium iron carbophosphate, a sodium manganese carbophosphate and a sodium cobalt carbophosphate, further preferably at least either one of a sodium iron carbophosphate and a sodium manganese carbophosphate, still more preferably a sodium iron carbophosphate, may be mentioned.

The physical properties of the Na polyanion are not particularly limited and may optionally be adjusted depending upon the battery structure desired. The physical properties may, for example, be the crystal system, the purity, the lattice constants, the crystallinity, the crystallite size, the crystal orientation, the pore size, the pore size distribution, the pore volume, the BET specific surface area, the primary particle size, the secondary particle size, the powder particle size, the particle size distribution, the form of particles and the particle structure, but are not limited thereto.

The Na polyanion has a crystallite size of preferably 90 Å or longer and 400 Å or shorter, 95 Å or longer and 360 Å or shorter, 100 Å or longer and 300 Å or shorter, or 150 Å or longer and 280 Å or shorter. The crystallite size in the present embodiment is a size obtained by Williamson-Hall method (hereinafter also referred to as "WH size") obtained from an XRD pattern. The WH size is a crystallite size obtained from two or more XRD peaks attributable to the Na polyanion in the XRD pattern. Specifically, with respect to two or more XRD peaks attributable to the Na polyanion, the following plotting is conducted. From plots at a plurality of points by the least-squares method, the following first-order approximation is obtained, and the inverse of the y-intercept of the first-order approximation, is the crystallite size.

<Plot>

$Y=(\beta \cdot \sin\theta)/\lambda$ $X=\sin\theta/\lambda$

<First-Order Approximation>

$Y=2\eta \cdot X+(1/\varepsilon)$  formula 1

In these formulae, $\beta$ is the half width (°), $\theta$ is the diffraction angle (°), $\lambda$ is the wavelength (nm) of the radiation source, $\eta$ is the random distortion, and $\varepsilon$ is the crystallite size (Å), and, $1/\varepsilon$ in the first-order approximation is the y-intercept. $2\eta$ corresponds to the slope of the first-order approximation obtained by plotting of the XRD peaks.

The WH size is preferably the crystallite size obtained from XRD peaks corresponding to (020) plane, (220) plane and (002) plane in an XRD pattern. Specifically, with respect to XRD peaks corresponding to the (020) plane, the (220) plane and the (002) plane, the above plotting is conducted. From the obtained plots at the three points by the least-squares method, the above first-order approximation is obtained, and the inverse of the y-intercept of the first-order approximation, is the crystallite size.

XRD peaks corresponding to the (020) plane, (220) plane and (002) plane of the Na polyanion of the present embodiment may be confirmed as XRD peaks having peak tops at the following 2θ (hereinafter also referred to as "main peak group").

(020) plane: 2θ=26.39° to 27.06°
(220) plane: 2θ=33.19° to 33.88°
(002) plane: 2θ=34.59° to 34.99°

When the Na polyanion is represented by the formula $Na_{3-x}FePO_4CO_3$ (when it is a sodium iron carbophosphate), 2θ of the main peak group are preferably the following values, and further, the crystallite size is preferably 150 Å or longer and 400 Å or shorter, particularly preferably 170 Å or longer and 360 Å or shorter.

(020) plane: 2θ=26.86° to 26.94°
(220) plane: 2θ=33.56° to 33.69°
(002) plane: 2θ=34.76° to 34.86°

When the Na polyanion is represented by the formula $Na_{3-x}MnPO_4CO_3$ (when it is a sodium manganese carbophosphate), 2θ of the main peak group are preferably the following values, and further, the crystallite size is preferably 90 Å or longer and 200 Å or shorter, particularly preferably 90 Å or longer and 180 Å or shorter.

(020) plane: 2θ=26.39° to 26.47°
(220) plane: 2θ=33.19° to 33.29°
(002) plane: 2θ=34.59° to 34.77°

When the Na polyanion is represented by the formula $Na_{3-x}NiPO_4CO_3$ (when it is a sodium nickel carbophosphate), 2θ of the main peak group are preferably the following values, and further, the crystallite size is preferably 95 Å or longer and 300 Å or shorter, particularly preferably 100 Å or longer and 250 Å or shorter.

(020) plane: 2θ=26.91° to 27.06°
(220) plane: 2θ=33.68° to 33.88°
(002) plane: 2θ=34.84° to 34.99°

When the Na polyanion is represented by the formula $Na_{3-x}CoPO_4CO_3$ (when it is a sodium cobalt carbophosphate), 2θ of the main peak group are preferably the following values, and further, the crystallite size is preferably 150 Å or longer and 400 Å or shorter, particularly preferably 180 Å or longer and 370 Å or shorter.

(020) plane: 2θ=26.88° to 26.94°
(220) plane: 2θ=33.63° to 33.69°
(002) plane: 2θ=34.84° to 34.88°

The XRD pattern in the present embodiment may be measured under the following conditions.

Radiation source: CuKα rays (λ=1.5405 Å)
Measurement mode: Step scanning
Scanning condition: 20°/min
Measurement time: 3 seconds
2θ: 5° to 90°

The obtained XRD pattern may be subjected to Rietveld refinement by commercial analysis software (for example, data processing software PDXL-2 attached to an X-ray diffraction apparatus (for example, SmartLab, manufactured by Rigaku Corporation)) to identify and analyze the crystal phase of the product.

The Na polyanion preferably belongs to a monoclinic crystal system. Further, it is more preferred that the space group of the monocyclic crystal system belongs to at least either one of P21/m and P21. The monoclinic crystal system to which the Na polyanion belongs is a crystal system such that the lattice constants a, b and c are different from one another, both α and γ are 90°, and, β is an angle other than 90°.

The Na polyanion of the present embodiment preferably has lattice constants a of 8.800 Å or longer and 9.050 Å or shorter, b of 6.570 Å or longer and 6.780 Å or shorter, c of 5.100 Å or longer and 5.190 Å or shorter, α of 90.00°, γ of 90.00°, and β of 89.00° or more and 90.50° or less. More preferred lattice constants may be a of 8.820 Å or longer and 9.030 Å or shorter, b of 6.580 Å or longer and 6.770 Å or shorter, α of 90.00°, γ of 90.00°, c of 5.110 Å or longer and 5.180 Å or shorter, and β of 89.10° or more and 90.20° or less.

In the present embodiment, the Na polyanion represented by the formula $Na_{3-x}FePO_4CO_3$ has lattice constants a of 8.930 Å or longer and 8.985 Å or shorter, preferably 8.940 Å or longer and 8.975 Å or shorter, more preferably 8.959 Å or longer and 8.970 Å or shorter, b of 6.600 Å or longer and 6.655 Å or shorter, preferably 6.610 Å or longer and 6.645 Å or shorter, more preferably 6.615 Å or longer and 6.635 Å or shorter, c of 5.125 Å or longer and 5.175 Å or shorter, preferably 5.135 Å or longer and 5.165 Å or shorter, more preferably 5.145 Å or longer and 5.159 Å or shorter, α of 90.00°, γ of 90.00°, β of 89.30° or more and 89.80° or less, preferably 89.50° or more and 89.70° or less.

In the present embodiment, the Na polyanion represented by the formula $Na_{3-x}MnPO_4CO_3$ has lattice constants a of 8.960 Å or longer and 9.050 Å or shorter, preferably 8.970 Å or longer and 9.030 Å or shorter, more preferably 8.981 Å or longer and 9.030 Å or shorter, further preferably 9.000 Å or longer and 9.025 Å or shorter, b of 6.705 Å or longer and 6.780 Å or shorter, preferably 6.715 Å or longer and 6.775 Å or shorter, more preferably 6.729 Å or longer and 6.770 Å or shorter, further preferably 6.745 Å or longer and 6.765 Å or shorter, c of 5.135 Å or longer and 5.190 Å or shorter, preferably 5.145 Å or longer and 5.180 Å or shorter, more preferably 5.150 Å or longer and 5.180 Å or shorter, α of 90.00°, γ of 90.00°, β of 89.90° or more and 90.50° or less, preferably 90.10° or more and 90.20° or shorter, more preferably 90.14° or more and 90.20° or less.

In the present embodiment, the Na polyanion represented by the formula $Na_{3-x}NiPO_4CO_3$ has lattice constants a of 8.800 Å or longer and 8.940 Å or shorter, preferably 8.815 Å or longer and 8.930 Å or shorter, more preferably 8.885 Å or longer and 8.930 Å or shorter, further preferably 8.900 Å or longer and 8.925 Å or shorter, b of 6.570 Å or longer and 6.660 Å or shorter, preferably 6.580 Å or longer and 6.650 Å or shorter, more preferably 6.625 Å or longer and 6.645 Å or shorter, c of 5.100 Å or longer and 5.180 Å or shorter, preferably 5.110 Å or longer and 5.170 Å or shorter, more preferably 5.129 Å or longer and 5.165 Å or shorter, further preferably 5.131 Å or longer and 5.160 Å or shorter, α of 90.00°, γ of 90.00°, β of 89.00° or more and 89.40° or less, preferably 89.10° or more and 89.30° or less, more preferably 89.15° or more and 89.29° or less, further preferably 89.15° or more and 89.25° or less.

In the present embodiment, the Na polyanion represented by the formula $Na_{3-x}CoPO_4CO_3$ has lattice constants α of 8.875 Å or longer and 8.940 Å or shorter, preferably 8.880 Å or longer and 8.930 Å or shorter, more preferably 8.885 Å or longer and 8.930 Å or shorter, further preferably 8.900 Å or longer and 8.925 Å or shorter, b of 6.605 Å or longer and 6.660 Å or shorter, preferably 6.615 Å or longer and 6.650 Å or shorter, more preferably 6.625 Å or longer and 6.645 Å or shorter, c of 5.125 Å or longer and 5.175 Å or shorter, preferably 5.130 Å or longer and 5.165 Å or shorter, more preferably 5.135 Å or longer and 5.160 Å or shorter, further preferably 5.140 Å or longer and 5.149 Å or shorter, α of 90°, γ of 90°, β of 89.20° or more and 89.65° or less, preferably 89.30° or more and 89.55° or less, more preferably 89.35° or more and 89.52° or less, further preferably 89.35° or more and 89.48° or less.

It is preferred that the Na polyanion has carbon on a part of or the entire surface, whereby electrical conductivity tends to be high. As the state where the Na polyanion has carbon (that is, as the carbon-coated Na polyanion), for example, a state where a part of or the entire surface of the Na polyanion is coated with carbon, and a state where at least a part of the Na polyanion has carbon in a sea-island structure, may be mentioned.

A method to bring the state where the Na polyanion has carbon is optional, and a method of mixing the Na polyanion with a carbon material may, for example, be mentioned. The carbon material is a carbon precursor, and is at least either one of carbon and a carbon compound, having electrical conductivity. As specific carbon materials as a carbon precursor, at least one member selected from the group consisting of furnace black, channel black, acetylene black and thermal black, further, at least either one of acetylene black and thermal black, still further, acetylene black may, for example, be mentioned. The atmosphere at the time of mixing may be any atmosphere under which the electrical conductivity of the carbon material is less likely to be impaired, and is preferably an inert atmosphere. The inert atmosphere may, for example, be an atmosphere of at least either one of nitrogen and argon. A method of mixing the Na polyanion with the carbon is not particularly limited so long as the state where the Na polyanion has carbon on a part of or the entire surface is achieved, and a mixing method while the carbon material is ground is preferred, a mixing method using a ball mill is preferred, and a mixing method using a planetary ball mill is more preferred.

The Na polyanion having carbon on its surface (carbon-coated Na polyanion) may be subjected to annealing treatment, for example, carbothermal treatment in an inert atmosphere. By such treatment, the electrical conductivity may be improved. Further, when the Na polyanion is a Na polyanion represented by the formula $Na_{3-x}FePO_4CO_3$, it may be considered that by the carbothermal treatment, the carbon on the surface of the Na polyanion precipitates electrically conductive iron phosphide as a reductant on the surface of the Na polyanion, thus reducing the contact resistance between Na polyanion particles. The method of the carbothermal treatment is not particularly limited, and a method of treating the Na polyanion having carbon on its surface in an inert atmosphere of at least either one of nitrogen and argon at 200° C. or higher and 700° C. or lower for 1 hour or longer and 12 hours or shorter, may, for example, be mentioned.

When the carbon-coated Na polyanion is subjected to carbothermal treatment, in addition to the carbon material such as acetylene black as the carbon precursor, a compound a part of which may be carbonized by thermal decomposition, may be used as a precursor. Such a compound may, for example, be an alcohol or an organic compound and is preferably at least one member selected from the group consisting of cyclodextrin, ascorbic acid, glycolic acid, malic acid, citric acid, fructose and sucrose.

The Na polyanion may be produced by an optional method. As a method for producing the Na polyanion, for example, a method of mechanically milling a composition containing sodium, a transition metal, a phosphate and a carbonate may be mentioned, and specifically, a method of mixing $NaMPO_4$ (M is at least one member selected from the group consisting of Fe, Mn, Ni and Co) and $Na_2CO_3$ and mechanically milling the mixture in an inert atmosphere of e.g. argon, may be mentioned. By such a method, a solid phase synthetic Na polyanion is obtained. As another method for producing the Na polyanion, for example, a method of subjecting a composition containing a sodium source, a transition metal source, a phosphate source, a carbonate source and water to hydrothermal treatment may be mentioned, a production method comprising a step of subjecting a composition containing a sodium source, a transition metal source, a phosphate source, a carbonate source and water to hydrothermal treatment, wherein the hydrothermal treatment temperature is 140° C. or higher 280° C. or lower, the pH of the composition is 7.5 or higher, is preferred, and it is more preferred that the composition contains two or more types of water-soluble sodium salts. By such a method, a liquid phase synthetic Na polyanion is obtained. Specifically, a method of subjecting a composition containing a transition metal sulfate, sodium phosphate, anhydrous sodium carbonate and water and having a pH of 7.5 or higher and 10.0 or lower to hydrothermal treatment under autogenous pressure at 160° C. or higher and 250° C. or lower may be mentioned.

The cathode of the aqueous sodium ion secondary battery of the present embodiment essentially contains the Na polyanion as the cathode active material. The content of the Na polyanion in the cathode active material is, as the proportion of the weight of the Na polyanion to the weight of the cathode active material, preferably 80 mass % or higher and 100 mass % or lower, more preferably 90 wt % or higher and 100 wt % or lower, particularly preferably 100 wt % (the cathode active material consists solely of the Na polyanion, that is, substantially no active material other than the Na polyanion is contained). Further, the cathode may contain the Na polyanion as a cathode mixture containing the cathode active material and at least either one of a binder and an electrically conductive material. As the binder and the electrically conductive material, known ones may be used. For example, as the binder, at least one member selected from the group consisting of fluororesins such as polyvinylidene fluoride (PVDF), polytetrafluoroethylene (PTFE) and ethylene tetrafluoroethylene (ETFE), polyethylene, polypropylene, SBR materials and imide materials, and as the electrically conductive material, for example, at least one member selected from the group consisting of carbon materials, electrically conductive fibers such as metal fibers, metal powders of copper, silver, nickel, aluminum, etc., and organic electrically conductive materials such as a polyphenylene derivative, may be mentioned. The carbon material as the electrically conductive material may, for example, be black lead, soft carbon, hard carbon, carbon black, Ketjenblack, acetylene black, graphite, activated carbon, carbon nanotubes, carbon fibers, a synthetic resin containing an aromatic ring, and mesoporous carbon obtained by firing e.g. petroleum pitch, but is not limited thereto. As a specific example of the cathode mixture, a cathode mixture containing the Na polyanion, at least either one of PVDF and PTFE, and at least one member selected from the group consisting of black lead, graphite, soft carbon, hard carbon and acetylene black, may be mentioned.

The cathode mixture may be produced by an optional method, such as a method of mixing the Na polyanion, the binder and the electrically conductive material by an optional method at a ratio suitable for the desired cathode mixture.

The aqueous sodium ion secondary battery of the present embodiment has, as the electrolytic solution, an aqueous electrolytic solution. The aqueous electrolytic solution contains water as a solvent and an electrolyte. The electrolyte may be a water-soluble sodium salt, and may, for example, be at least one member selected from the group consisting of $Na_2SO_4$, $NaNO_3$, $NaClO_4$ and NaOH. In view of handling efficiency, the electrolyte is preferably at least one member selected from the group consisting of $Na_2SO_4$, $NaNO_3$ and $NaClO_4$, more preferably $NaClO_4$. The electrolyte concentration in the electrolytic solution is not particularly limited, but with a view to increasing the energy density of the resulting sodium ion secondary battery, the electrolyte concentration (sodium salt concentration) in the electrolytic solution is preferably high, and may, for example, be 2 mol/L or higher as the sodium salt concentration, and may be the saturation solubility or lower. When $NaClO_4$ is used as the electrolyte, the electrolyte concentration ($NaClO_4$ concentration) in the electrolytic solution may, for example, be 5 mol/kg or higher, 7 mol/kg or higher, or 10 mol/kg or higher, and 17 mol/kg or lower.

In order to optimize physical properties and characteristics, such as storage stability of the electrolytic solution and battery characteristics, the electrolytic solution may contain additives. The additives may, for example, be succinic acid, glutamic acid, maleic acid, citraconic acid, gluconic acid, itaconic acid, diglycol, cyclohexanedicarboxylic acid, cyclopentanetetracarboxylic acid, 1,3-propanesultone, 1,4-butanesultone, methyl methanesulfonate, sulfolane, dimethylsulfone and N,N-dimethylmethanesulfonamide, but are not limited thereto. The content in the electrolytic solution is preferably from 0.01 to 10 wt %.

The anode of the sodium ion secondary battery of the present embodiment contains, as the anode active material, a material which does not inhibit intercalation and deintercalation of sodium ions of the cathode active material in the sodium ion secondary battery having an aqueous electrolytic solution. The anode active material may, for example, be at least one member selected from the group consisting of platinum, zinc, carbon materials, materials forming an alloy with sodium, sodium-containing transition metal oxides, and sodium-containing polyanion materials, and is preferably at least one member selected from the group consisting of carbon materials, polyimides, transition metal-containing cyano compounds and transition metal-containing polyanion compounds. As specific anode active materials, the carbon material may be activated carbon, the transition metal-containing cyano compound may be $Na_2Mn[Mn(CN)_6]$, and the transition metal-containing polyanion compound may be $NaTi_2(PO_4)_3$. As a particularly preferred anode active material, $NaTi_2(PO_4)_3$ may be mentioned.

The anode of the aqueous sodium ion secondary battery of the present embodiment may contain the anode active material as an anode mixture containing the anode active material and at least either one of a binder and an electrically conductive material. As the binder and the electrically conductive material, known ones may be used. For example, the same binder and electrically conductive material as ones which can be used for the cathode mixture may be mentioned. The anode mixture may be produced by an optional method, such as a method of mixing the anode active material, the binder and the electrically conductive material at a ratio suitable for the desired anode mixture.

As other constituents of the aqueous sodium ion secondary battery, such as the current collector, ones used for a known sodium ion secondary battery may be used.

Another aqueous sodium ion secondary battery of the present embodiment is an aqueous sodium ion secondary battery comprising a cathode, an anode and an aqueous electrolytic solution, wherein the cathode has a cathode active material containing at least a sodium transition metal polyanion represented by the formula $Na_{3-x}MPO_4CO_3$ (M is at least one member selected from the group consisting of Fe, Mn, Ni and Co, and x is 0 or more and 2 or less), the anode contains at least $NaTi_2(PO_4)_3$, and the aqueous electrolytic solution contains at least $NaClO_4$.

Another aqueous sodium ion secondary battery of the present embodiment is an aqueous sodium ion secondary battery comprising a cathode, an anode and an aqueous electrolytic solution, wherein the cathode has a cathode active material containing at least a sodium transition metal polyanion represented by the formula $Na_{3-x}MPO_4CO_3$ (M is at least one member selected from the group consisting of Fe, Mn and Co, and x is 0 or more and 2 or less), the anode contains at least $NaTi_2(PO_4)_3$, and the aqueous electrolytic solution contains at least $NaClO_4$.

Another aqueous sodium ion secondary battery of the present embodiment is an aqueous sodium ion secondary battery comprising a cathode, an anode and an aqueous electrolytic solution, wherein the cathode has a cathode active material containing at least a sodium transition metal polyanion represented by the formula $Na_{3-x}MPO_4CO_3$ (M is Fe or Mn, and x is 0 or more and 2 or less), the anode contains at least $NaTi_2(PO_4)_3$, and the aqueous electrolytic solution contains at least $NaClO_4$.

Another aqueous sodium ion secondary battery of the present embodiment is an aqueous sodium ion secondary battery comprising a cathode, an anode and an aqueous electrolytic solution, wherein the cathode has a cathode active material containing at least a sodium transition metal polyanion represented by the formula $Na_{3-x}MnPO_4CO_3$ (x is 0 or more and 2 or less), the anode contains at least $NaTi_2(PO_4)_3$, and the aqueous electrolytic solution contains at least $NaClO_4$.

Still another aqueous sodium ion secondary battery of the present embodiment is an aqueous sodium ion secondary battery comprising a cathode, an anode and an aqueous electrolytic solution, wherein the cathode has a cathode active material containing at least a sodium transition metal polyanion represented by the formula $Na_{3-x}FePO_4CO_3$ (x is 0 or more and 2 or less), the anode contains at least $NaTi_2(PO_4)_3$, and the aqueous electrolytic solution contains at least $NaClO_4$.

EXAMPLES

Now, the present embodiment will be described in further detail with reference to Examples. However, it should be understood that the present embodiment is by no means restricted to such specific Examples.

<Identification of Na Polyanion>

The XRD pattern of the Na polyanion obtained in Synthesis Example was measured under the following conditions.

Radiation source: CuKα rays (λ=1.5405 Å)
Measurement mode: Step scanning
Scanning condition: 20°/min
Measurement time: 3 seconds
2θ: 5° to 90°

The obtained XRD pattern was subjected to Rietveld refinement by data processing software PDXL-2 attached to an X-ray diffraction apparatus (apparatus name: SmartLab, manufactured by Rigaku Corporation) to identify and analyze the crystal phase of the product.

<Preparation of Sodium Ion Secondary Battery (Half Cell)>

The Na polyanion and acetylene black (AB) were mixed in a weight ratio of 70:30 by a planetary ball mill at 400 to 500 rpm for 9 hours in an Ar atmosphere to conduct carbon coating treatment to obtain a powdery cathode active material having the Na polyanion surface-coated with carbon (carbon-coated Na polyanion). The obtained cathode active material, AB and PTFE were mixed in a weight ratio of 60:30:10 to obtain a cathode mixture in the form of pellets having a diameter of 10 mm. Using the cathode mixture as the working electrode (cathode), plate-form metal zinc (Zn) as the counter electrode (anode), a silver chloride electrode (Ag/AgCl) as the reference electrode, and a 17M (17 mol/kg) aqueous $NaClO_4$ solution as the electrolytic solution, a half cell type sodium ion secondary battery in a beaker form as shown in FIG. 1 was prepared.

<Preparation of Sodium Ion Secondary Battery (Coin Cell)>

(Preparation of Anode)

As the anode active material, $NaTi_2(PO_4)_3$ synthesized by Pechini process shown below was used. First, 40 ml of a solution having $Ti(OCH_2CH_2CH_2CH_3)_4$ dissolved in hydrogen peroxide 30% solution, 15 ml of 28% aqueous ammonia, $Na_2CO_3$, 10 ml of a nitric acid solution of citric acid in an amount of 2 molar times the amount of Ti, 10 ml of an aqueous $NH_4H_2PO_4$ solution and ethylene glycol were mixed, and the obtained mixed solution was evaporated to dryness at 80° C. for 1 to 2 hours. Then, the obtained residue was heated in air at 140° C. to obtain a brown gel composition, which was calcined in air at 350° C. and then calcined in air at 800° C. to obtain $NaTi_2(PO_4)_3$.

The obtained $NaTi_2(PO_4)_3$ was mixed with AB in a weight ratio of $NaTi_2(PO_4)_3$ to AB of 70:25 by a planetary ball mill at 400 rpm for 1 hour to conduct carbon coating treatment to obtain a powdery anode active material having $NaTi_2(PO_4)_3$ surface-coated with carbon. The obtained anode active material and PTFE were mixed in a weight ratio of 95:5 and formed into pellets having a diameter of 10 mm, which were used as the anode mixture.

(Preparation of Coin Cell)

Figure 2:
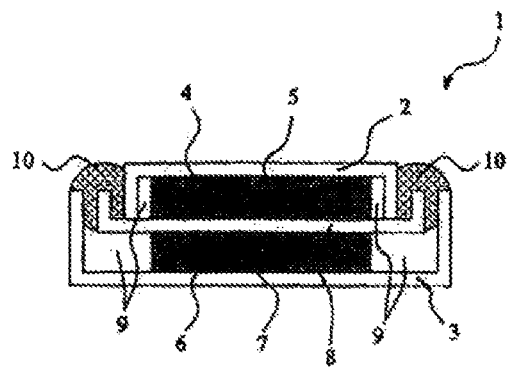
FIG. 2 is a schematic view illustrating a sodium ion secondary battery (coin cell).
Figure 3:
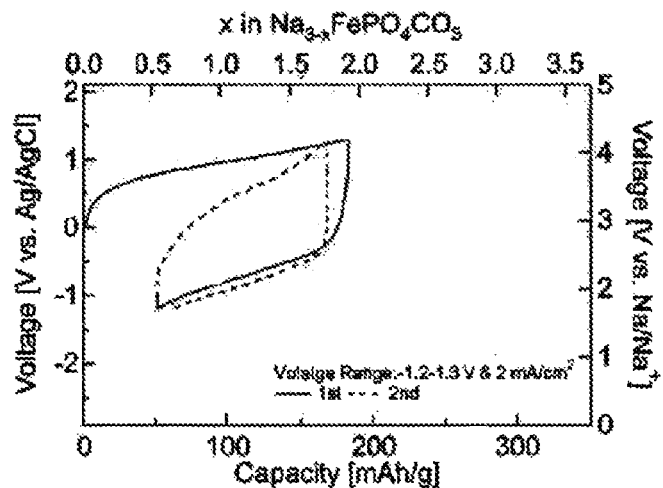
FIG. 3 is charge and discharge profiles for the first and second cycles in Example 1.
Figure 4:
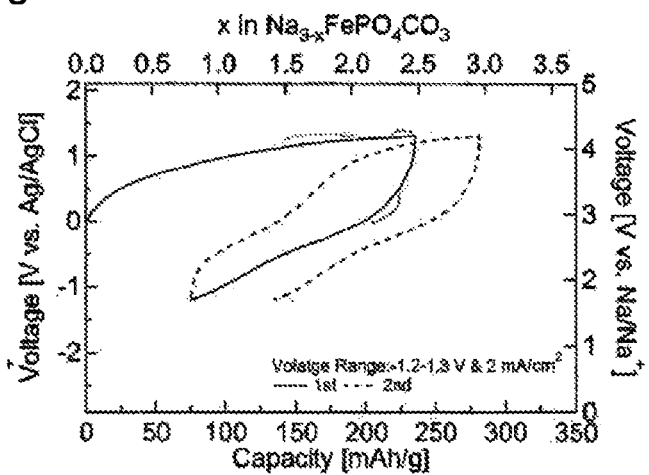
FIG. 4 is charge and discharge profiles for the first and second cycles in Example 2.
Figure 5:
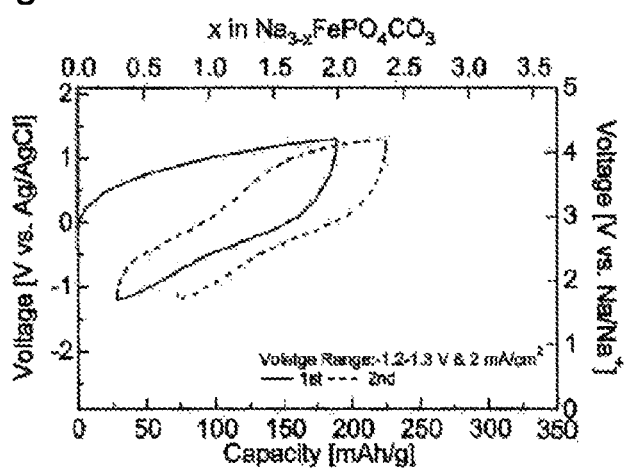
FIG. 5 is charge and discharge profiles for the first and second cycles in Example 3.
Figure 6:
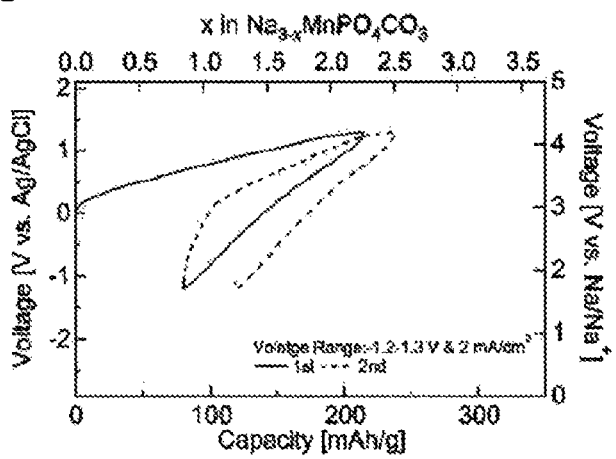
FIG. 6 is charge and discharge profiles for the first and second cycles in Example 4.
Figure 7:
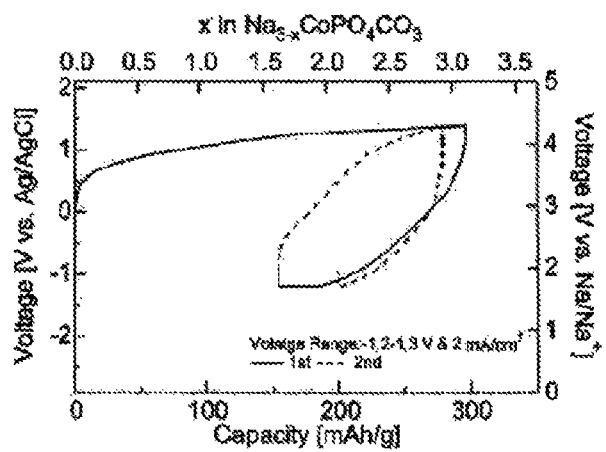
FIG. 7 is charge and discharge profiles for the first and second cycles in Example 5.
Figure 8:
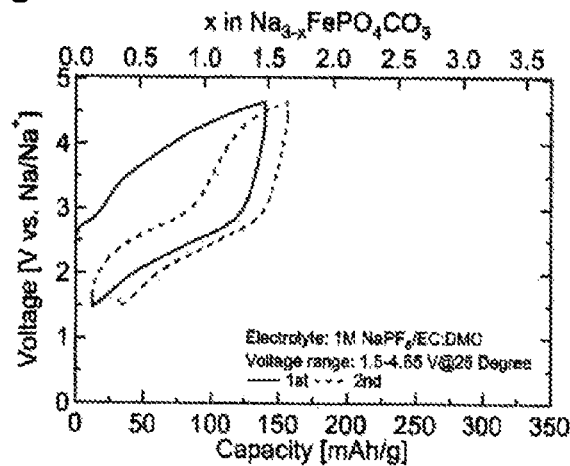
FIG. 8 is charge and discharge profiles for the first and second cycles in Reference Example 1.

Using, as the cathode and the anode, the cathode mixture produced in the same manner as for the cathode mixture used for the half cell and the above anode mixture, respectively, and as the electrolytic solution, a 17M aqueous $NaClO_4$ solution, a coin cell type sodium ion secondary battery shown in FIG. 2 was prepared. The amounts of the cathode and the anode in the sodium ion secondary battery were adjusted so that the weight ratio of the cathode active material:the anode active material=1:1.5.

<Synthesis of Na Polyanion>

Synthesis Example 1 (Synthesis of Sodium Iron Carbophosphate)

Iron(II) sulfate heptahydrate ($FeSO_4 \cdot 7H_2O$), sodium phosphate dodecahydrate ($Na_3PO_4 \cdot 12H_2O$) and anhydrous sodium carbonate ($Na_2CO_3$) were ground and mixed, and pure water was added to the mixture to obtain a composition having the following composition.
Iron(II) sulfate heptahydrate: 13.6 wt %
Sodium phosphate dodecahydrate: 18.7 wt %
Anhydrous sodium carbonate: 5.2 wt %
Pure water: the rest The composition had a pH of 11.0. The composition was packed and sealed in a Teflon (registered trademark) resin container with a lid, the container was placed in a constant temperature oven, and hydrothermal treatment was applied under the following conditions.
Hydrothermal treatment temperature: 180° C.
Hydrothermal treatment time: 16 hours
Hydrothermal treatment pressure: under autogenous pressure After the hydrothermal treatment, the product cooled to room temperature was mixed with pure water in a sufficient amount and stirred to be washed, and subjected to suction filtration using a filter paper with a pore size of 0.2 μm to obtain sodium iron carbophosphate.

The obtained sodium iron carbophosphate was dried in vacuum at 110° C. for 4 hours and ground in a mortar to obtain sodium iron carbophosphate in this Synthesis Example. The sodium iron carbophosphate in this Synthesis Example had a $Na_3FePO_4CO_3$ purity of 100 wt %, and no crystallized product other than $Na_3FePO_4CO_3$ was confirmed in its XRD pattern. $Na_3FePO_4CO_3$ in this Synthesis Example is a compound having a crystallite size (WH size) of 270 Å, having lattice constants a of 8.953 Å, b of 6.633 Å, c of 5.152 Å, α of 90.00°, β of 89.58° and γ of 90.00°, having a monoclinic crystal system, having a Bonshtedite structure and belonging to the space group P21/m, and the main XRD peaks were as follows.
(020) plane: 2θ=26.86° relative intensity=81
(220) plane: 2θ=33.57° relative intensity=78
(002) plane: 2θ=34.80° relative intensity=100

Synthesis Example 2 (Synthesis of Sodium Iron Carbophosphate)

Sodium carbonate ($Na_2CO_3$) and sodium iron phosphate (Maricite $NaFePO_4$) were mixed in a stoichiometric ratio 1:1 and then mixed by a planetary ball mill in an Ar atmosphere at 600 rpm for 12 hours. To the obtained powder, AB was added so that its weight ratio would be 15 wt %, and mixed by a planetary ball mill in an Ar atmosphere at 600 rpm for 12 hours, and further, AB was added so that its weight ratio would be 15 wt %, and mixed by a planetary ball mill in an Ar atmosphere at 400 rpm for 3 hours to obtain sodium iron carbophosphate $Na_3FePO_4CO_3$.

Synthesis Example 3 (Synthesis of Sodium Manganese Carbophosphate)

Manganese sulfate pentahydrate ($MnSO_4 \cdot 5H_2O$), sodium phosphate dodecahydrate ($Na_3PO_4 \cdot 12H_2O$) and anhydrous sodium carbonate ($Na_2CO_3$) were ground and mixed, and pure water was added to the mixture to obtain a composition having the following composition.
Manganese sulfate pentahydrate: 12.0 wt %
Sodium phosphate dodecahydrate: 18.9 wt %
Anhydrous sodium carbonate: 5.2 wt %
Pure water: the rest The composition had a pH of 11.0. The composition was packed and sealed in a Teflon (registered trademark) resin container with a lid, the container was placed in a constant temperature oven, and hydrothermal treatment was applied under the following conditions.
Hydrothermal treatment temperature 180° C.
Hydrothermal treatment time 72 hours
Hydrothermal treatment pressure under autogenous pressure After the hydrothermal treatment, the product cooled to room temperature was mixed with pure water in a sufficient amount and stirred to be washed, and subjected to suction filtration using a filter paper with a pore size of 0.2 μm to obtain sodium manganese carbophosphate.

The obtained sodium manganese carbophosphate was dried in vacuum at 110° C. for 4 hours and ground in a mortar to obtain sodium manganese carbophosphate in this Synthesis Example. The sodium manganese carbophosphate in this Synthesis Example had a $Na_3MnPO_4CO_3$ purity of 100 wt %, and no crystallized product other than $Na_3MnPO_4CO_3$ was confirmed in its XRD pattern. $Na_3MnPO_4CO_3$ in this Synthesis Example is a compound having a crystallite size (WH size) of 172 Å, having lattice constants a of 9.003 Å, b of 6.745 Å, c of 5.166 Å, α of 90.00°, β of 90.16° and γ of 90.00°, having a monoclinic crystal system, having a Sidorenkite structure (isomorphic to a Bonshtedite structure) and belonging to the space group P21/m, and the main XRD peaks were as follows.
(020) plane: 2θ=26.44° relative intensity=100
(220) plane: 2θ=33.25° relative intensity=100
(002) plane: 2θ=34.68° relative intensity=72

Synthesis Example 4 (Synthesis of Sodium Manganese Carbophosphate)

Sodium carbonate ($Na_2CO_3$) and sodium manganese phosphate (olivine $NaMnPO_4$) were mixed in a stoichiometric ratio 1:1 and then mixed by a planetary ball mill in an Ar atmosphere at 600 rpm for 12 hours. To the obtained powder, AB was added so that its weight ratio would be 15 wt % and mixed by a planetary ball mill in an Ar atmosphere at 600 rpm for 12 hours, and further, AB was added so that its weight ratio would be 15 wt % and mixed by a planetary ball mill in an Ar atmosphere at 400 rpm for 3 hours to obtain sodium manganese carbophosphate $Na_3MnPO_4CO_3$.

Synthesis Example 5 (Synthesis of Sodium Nickel Carbophosphate)

Nickel sulfate hexahydrate ($NiSO_4 \cdot 6H_2O$), sodium phosphate dodecahydrate ($Na_3PO_4 \cdot 12H_2O$), anhydrous sodium carbonate ($Na_2CO_3$) and anhydrous sodium sulfite ($Na_2SO_3$) were ground and mixed, and pure water was added to the mixture to obtain a composition having the following composition.
Nickel sulfate hexahydrate 13.7 wt %
Sodium phosphate dodecahydrate: 19.6 wt %
Anhydrous sodium carbonate: 5.4 wt %
Pure water: the rest The composition had a pH of 11.0. The composition was packed and sealed in a Teflon (registered trademark) resin container with a lid, the container was placed in a constant temperature oven, and hydrothermal treatment was applied under the following conditions.

Hydrothermal treatment temperature: 180° C.
Hydrothermal treatment time: 16 hours
Hydrothermal treatment pressure: under autogenous pressure After the hydrothermal treatment, the product cooled to room temperature was mixed with pure water in a sufficient amount and stirred to be washed, and subjected to suction filtration using a filter paper with a pore size of 0.2 μm to obtain sodium nickel carbophosphate.

The obtained sodium nickel carbophosphate was dried in vacuum at 110° C. for 4 hours and ground in a mortar to obtain sodium nickel carbophosphate in this Synthesis Example. The sodium nickel carbophosphate in this Synthesis Example had a $Na_3NiPO_4CO_3$ purity of 100 wt %, and no crystallized product other than $Na_3NiPO_4CO_3$ was confirmed in its XRD pattern. $Na_3NiPO_4CO_3$ in this Synthesis Example is a compound having a crystallite size (WH size) of 107 Å, having lattice constants a of 8.833 Å, b of 6.613 Å, c of 5.147 Å, α of 90.00°, β of 89.29° and γ of 90.00°, having a monoclinic crystal system, having a structure isomorphic to a Bonshtedite structure and belonging to the space group P21/m, and the main XRD peaks were as follows.

(020) plane: 2θ=26.91° relative intensity=96
(220) plane: 2θ=33.68° relative intensity=100
(002) plane: 2θ=34.89° relative intensity=88

Synthesis Example 6 (Synthesis of Sodium Cobalt Carbophosphate)

Cobalt sulfate heptahydrate ($CoSO_4 \cdot 7H_2O$), sodium phosphate dodecahydrate ($Na_3PO_4 \cdot 12H_2O$) and anhydrous sodium carbonate ($Na_2CO_3$) were ground and mixed, and pure water was added to the mixture to obtain a composition having the following composition.

Cobalt sulfate heptahydrate: 14.4 wt %
Sodium phosphate dodecahydrate: 19.4 wt %
Anhydrous sodium carbonate: 5.4 wt %
Pure water: the rest The composition had a pH of 11.0. The composition was packed and sealed in a Teflon (registered trademark) resin container with a lid, the container was placed in a constant temperature oven, and hydrothermal treatment was applied under the following conditions.

Hydrothermal treatment temperature: 180° C.
Hydrothermal treatment time: 16 hours
Hydrothermal treatment pressure: under autogenous pressure After the hydrothermal treatment, the product cooled to room temperature was mixed with pure water in a sufficient amount and stirred to be washed, and subjected to suction filtration using a filter paper with a pore size of 0.2 μm to obtain sodium cobalt carbophosphate.

The obtained sodium cobalt carbophosphate was dried in vacuum at 110° C. for 4 hours and ground in a mortar to obtain sodium cobalt carbophosphate in this Synthesis Example. The sodium cobalt carbophosphate in this Synthesis Example had a $Na_3CoPO_4CO_3$ purity of 100 wt %, and no crystallized product other than $Na_3CoPO_4CO_3$ was confirmed in its XRD pattern. $Na_3CoPO_4CO_3$ in this Synthesis Example is a compound having a crystallite size (WH size) of 220 Å, having lattice constants a of 8.903 Å, b of 6.637 Å, c of 5.148 Å, α of 90.00°, β of 89.51° and γ of 90.00°, having a monoclinic crystal system, having a structure isomorphic to a Bonshtedite structure and belonging to the space group P21/m, and the main XRD peaks were as follows.

(020) plane: 2θ=26.88° relative intensity=89
(220) plane: 2θ=33.63° relative intensity=94
(002) plane: 2θ=34.85° relative intensity=100

Example 1

A sodium ion secondary battery (half cell) was prepared by using, as the cathode active material, the sodium iron carbophosphate $Na_3FePO_4CO_3$ in Synthesis Example 1, and subjected to charge and discharge test at a current density of 2 mA/cm² at a voltage within a range of −1.2 V to 1.3 V to the Ag/AgCl reference electrode at room temperature. The discharge capacity at the first cycle was 134.3 mAh/g.

Example 2

A sodium ion secondary battery (half cell) was prepared in the same manner as in Example 1 except that the sodium iron carbophosphate $Na_3FePO_4CO_3$ obtained in Synthesis Example 2 was used as the cathode active material, and subjected to charge and discharge test. The discharge capacity at the first cycle was 159.4 mAh/g.

Example 3

A sodium ion secondary battery (coin cell) was prepared by using, as the cathode active material, the sodium iron carbophosphate $Na_3FePO_4CO_3$ obtained in Synthesis Example 2, and subjected to charge and discharge test at a current density of 2 mA/cm² at a cell voltage within a range of −1.2 V to 1.3 V at room temperature. The discharge capacity at the first cycle was 160.5 mAh/g.

Example 4

A sodium ion secondary battery (half cell) was prepared in the same manner as in Example 1 except that the sodium manganese carbophosphate $Na_3MnPO_4CO_3$ obtained in Synthesis Example 4 was used as the cathode active material, and subjected to charge and discharge test. The discharge capacity at the first cycle was 134.5 mAh/g.

Example 5

A sodium ion secondary battery (half cell) was prepared in the same manner as in Example 1 except that the sodium cobalt carbophosphate $Na_3CoPO_4CO_3$ obtained in Synthesis Example 6 was used as the cathode active material, and subjected to charge and discharge test. The discharge capacity at the first cycle was 141.2 mAh/g.

Reference Example (Non-Aqueous Sodium Ion Secondary Battery)

The discharge capacity of a known sodium ion secondary battery having a non-aqueous electrolytic solution was measured by the method in accordance with Japanese Patent No. 6270056.

In the same manner as in Example 1, a sodium ion secondary battery (coin cell) comprising, as the electrolytic solution, a non-aqueous electrolytic solution having 1M sodium hexafluorophosphate ($NaPF_6$) dissolved in a mixed solvent of ethylene carbonate (EC) and dimethyl carbonate (DMC) in a volume ratio of 1:1, the sodium iron carbophosphate Na$_3$FePO$_4$CO$_3$ obtained in Synthesis Example 2 as the cathode active material, and metal sodium as the anode, was prepared. The battery was subjected to charge and discharge test at a current density of 2 mA/cm$^2$ at a cell voltage within a range of from 1.5 to 4.65 V at room temperature. The discharge capacity at the first cycle was 128.0 mAh/g.

The operating voltage range in Reference Example is more than 3 V and is higher than the operating voltage range in Examples. However, the discharge capacity is lower than in Example 3. Thus, it is found that the aqueous sodium ion secondary batteries in Examples of the present invention achieve a higher electrochemical capacity as compared with a known non-aqueous sodium ion secondary battery.

REFERENCE SYMBOLS

1: sodium ion secondary battery (coin cell)
2: anode lid
3: cathode container
4: anode current collector
5: anode mixture
6: cathode current collector
7: cathode mixture
8: separator
9: space (electrolytic solution)
10: gasket The entire disclosure of Japanese Patent Application No. 2019-098326 filed on May 27, 2019 including specification, claims, summary and drawings is incorporated herein by reference in its entirety.

The invention claimed is:

1. An aqueous sodium ion secondary battery comprising a cathode, an anode, an electrolytic solution and a separator, wherein the cathode comprises a cathode active material containing at least a sodium transition metal polyanion represented by the formula Na$_{3-x}$MPO$_4$CO$_3$ (M is at least one member selected from the group consisting of Fe, Mn, Ni and Co, and x is 0 or more and 2 or less), and the electrolytic solution is an aqueous electrolytic solution.

2. The aqueous sodium ion secondary battery according to claim 1, wherein the sodium transition metal polyanion has carbon on a part of or the entire surface.

3. The aqueous sodium ion secondary battery according to claim 1, wherein the sodium transition metal polyanion has a crystallite size of 90 Å or longer and 400 Å or shorter.

4. The aqueous sodium ion secondary battery according to claim 1, wherein the aqueous electrolytic solution contains at least one member selected from the group consisting of Na$_2$SO$_4$, NaNO$_3$ and NaClO$_4$.

5. The aqueous sodium ion secondary battery according to claim 1, wherein the aqueous electrolytic solution contains NaClO$_4$.

6. The aqueous sodium secondary battery according to claim 5, wherein the electrolyte concentration in the electrolytic solution is 5 mol/kg or higher.

7. The aqueous sodium ion secondary battery according to claim 1, wherein the anode contains at least NaTi$_2$(PO$_4$)$_3$.

8. The aqueous sodium ion secondary battery according to claim 1, wherein the cathode comprises a cathode active material containing at least a sodium transition metal polyanion represented by the formula Na$_{3-x}$FePO$_4$CO$_3$ (x is 0 or more and 2 or less), the anode contains at least NaTi$_2$(PO$_4$)$_3$, and the aqueous electrolytic solution contains at least NaClO$_4$.

9. A method comprising:
providing an aqueous sodium ion secondary battery, the aqueous sodium ion secondary battery having a cathode active material which contains at least a sodium transition metal polyanion represented by the formula Na$_{3-x}$MPO$_4$CO$_3$ (M is at least one member selected from the group consisting of Fe, Mn, Ni and Co, and x is 0 or more and 2 or less); and
charging and/or discharging the aqueous sodium ion secondary battery.

10. The method according to claim 9, wherein M contains at least Fe.

* * * * *